Patented Nov. 27, 1945

2,389,955

UNITED STATES PATENT OFFICE 2,389,955

PROCESS OF PRODUCING FAT-SOLUBLE VITAMIN CONCENTRATES

Loran O. Buxton, Belleville, N. J., assignor to National Oil Products Company, Harrison, N. J., a corporation of New Jersey No Drawing. Application January 4, 1941, Serial No. 373,145

5 Claims. (Cl. 167—81)

This invention relates to processes for improving vitamin A or D containing oils by treatment with alkali; more particularly this invention relates to the preparation of vitamin A and D concentrates from fish liver oils.

As is well known in the art, it is comon practice to subject vitamin A or D containing oils, e. g., fish liver oils, to treatment with alkali in order to effect an improvement in their characteristics. Thus, for example, it has long been the practice to subject fish liver oils to an alkali refining treatment by contacting the oils with an aqueous solution of a strong alkali; the free fatty acids contained in the oil are thereby saponified and subsequently removed together with other undesirable constituents, thus rendering the oil more palatable. Extensive practice of this procedure has, however, demonstrated that contacting fish liver oils with alkali not only saponifies the free fatty acids and thereby permits their removal, but also may destroy the natural antioxidants, if any, present in the oil. As a result, alkali refining such oils may tend to make the refined oils much more susceptible to oxidative deterioration than the crude oils, so that even though the refined oils have been rendered more palatable by the alkali refining treatment, this improvement may be only temporary because of the tendency of undesirable tastes and odors to develop upon permitting the refined oils to stand under atmospheric conditions.

It has also been the practice in the fat-soluble vitamin industry to prepare concentrates by saponifying vitamin A or D containing oils with a strong alkali, and then extracting the unsaponifiable fraction from the soap; the unsaponifiable fraction thus obtained contains the vitamin A or D concentrated therein in the alcohol form. Because of the considerable increase in vitamin potency effected by this procedure, it has been successfully used to prepare highly potent vitamin A or D containing products. However, recently it has been noted that this process for the preparation of vitamin concentrates has certain disadvantages. In the first place, this process destroys the natural antioxidants present in the vitamin A or D containing oil, with the result that the concentrate obtained does not have as high a degree of stability as might be desired. In the second place, this saponification procedure tends to concentrate in the unsaponifiable fraction constituents responsible for the undesirable odors and tastes, so that precautions have to be taken in order to prevent the undue development of these undesirable properties in the final product.

From the above discussion it will be evident that there are certain important difficulties incidental to processes designed to improve the characteristics of vitamin A or D containing oils by treatment with alkali. While these difficulties may be largely attributable to destruction of the antioxidants which may be present in the oils, the alkali itself, regardless of the presence or absence of the natural antioxidants, affects certain of the constituents in the oils so as to cause the development of some of the undesirable tendencies above referred to. Hence there has been considerable demand in the industry for processes capable of improving the characteristics of vitamin A or D containing oils by alkali treatment, which processes do not possess the disadvantages hereinabove mentioned.

The objects of this invention is to provide an improved process for treating vitamin A or D containing oils with alkali.

A more specific object of this invention is to provide a simple and effective method for preparing highly stable vitamin A or D concentrates having improved tastes and odors.

I have made the surprising discovery that the difficulties incidental to the treatment of a vitamin A or D containing oil with alkali may be avoided by carrying out the treatment in the presence of an added antioxidant capable of increasing the stability of the oil to be treated. Upon treating a vitamin A or D containing oil stabilized in this manner with alkali, the valuable vitamin constituents of the oil are protected from oxidative influences during the alkali treatment; moreover, I have surprisingly found that the presence of the antioxidant substance in the oil being treated greatly diminishes the detrimental effects of the alkali upon the constituents of the oil. Because of these factors the products obtained by the practice of this invention are more stable and have improved tastes and odors as compared to products produced in the absence of antioxidants. My invention is applicable both to the alkali refining of vitamin A or D containing oils and to the production of concentrates therefrom by saponification and recovery of the unsaponifiable fraction. Thus, for example, it has been discovered that by operating in accordance with this invention vitamin A or D containing oils may be contacted with alkali and the free fatty acids contained therein thus removed without danger of the resulting products being highly unstable, as has been the case in prior practice. Furthermore, the presence of the added antioxidant in vitamin A or D containing oils permits their saponification to produce products having improved tastes and odors and greater stability than heretofore obtainable. The preferred embodiment of my invention involves subjecting a vitamin A or D containing oil to treatment with an alkali in the presence of antioxidants extracted from vegetable oils with a suitable solvent by the treatment disclosed in my copending application Serial No. 351,909, filed August 8, 1940, now Patent No. 2,345,576. These antioxidants, I have found, are completely compatible with the vitamin A or D containing oils to be treated; furthermore, they are not substantially destroyed during the alkali treatment, so that they not only protect the vitamins during saponification, but also are recovered along with the desired vitamins in the unsaponifiable fractions, thereby greatly improving the stability of the vitamin concentrates and repressing the development of undesirable tastes and odors. However, other antioxidants, such as those set forth hereinbelow, which are capable of stabilizing the oil to be treated, may also be employed in the practice of this invention.

The oils which may be treated in accordance with the practice of this invention may be any fat-soluble vitamin-containing marine oils which normally contain vitamins A and/or D. My invention is particularly applicable to the treatment of fish liver oils such as cod liver oil, tuna liver oil, halibut liver oil, shark liver oil, ling cod liver oil, and sword fish liver oil; however, other fish or animal oils which contain appreciable amounts of either vitamin A or D may be treated. The expression "fat-soluble vitamin-containing marine oils" is employed herein to connote fish and fish liver oils which contain vitamins A and/or D. Furthermore, glyceride oils containing vitamins A or D in alcohol form dissolved therein may be advantageously treated by my process.

The antioxidants preferably employed in the practice of this invention are those extracted from vegetable oils by the solvent extraction procedure described in my copending application hereinabove referred to. This procedure is preferably carried out by extracting a vegetable oil or a mixture of such oils with a solvent selected from the classes listed below:

*Table I*

(1) Aliphatic and alicyclic monohydroxy alcohols containing from 3 to 6 carbon atoms.
(2) Esters formed by the reaction of aliphatic and alicyclic alcohols with aliphatic monocarboxylic acids, said esters containing not more than 8 carbon atoms.
(3) Aliphatic and alicyclic aldehydes containing not more than 6 carbon atoms.
(4) Aliphatic ketones containing not more than 6 carbon atoms.

It will be noted that the solvents above listed are all liquid aliphatic organic compounds having the properties of being miscible with fatty materials at temperatures above room temperature and partially immiscible therewith at temperatures substantially below room temperature, and my experiments have shown that solvents falling within this class of compounds may be used to extract natural antioxidants from the vegetable oils. Among the particular solvents which have been found to be especially suitable are n-propyl alcohol, isopropyl alcohol, n-butyl alcohol, n-amyl alcohol, isoamyl alcohol, secondary amyl alcohol, furfuryl alcohol, allyl alcohol, diacetone alcohol, $\beta$-hydroxy ethyl acetate, methyl formate, ethyl formate, ethyl acetate, methyl acetate, isopropyl acetate, glycol diformate, glycol diacetate, methyl levulinate, ethyl levulinate, methyl aceto acetate, ethyl aceto acetate, methyl furoate, vinyl acetate, furfural, propionaldehyde, crotonaldehyde, acetone, methyl ethyl ketone, acetonyl acetone and propylene chlorhydrin. The extraction is most advantageously carried out by thoroughly mixing the vegetable oil with at least an equal volume of the solvent at a temperature above room temperature, and then cooling the mixture to a temperature within the range of 0° C. to —70° C., whereby a solvent layer containing the majority of the antioxidants separates. These antioxidants may then be recovered in concentrated form by evaporation of the solvent. Further details with regard to the production of these antioxidants from vegetable oils may be found in my copending application hereinabove mentioned.

It is to be understood that there are many other antioxidants or mixtures thereof which may be employed as the stabilizing agents in the practice of my invention. Thus, for example, antioxidants such as the hydroxy diphenyls, p-aminophenol, pyrogallol, pyrocatechol, vanillyl alcohol, coniferyl alcohol, eugenol, hydroquinone mono ethers, duroquinol, thiourea and its substitution products, morpholine and derivatives thereof, ethanolamine, piperazine, methyl glucamine, amyl arabinamine, glutamine, maleic acid and aconitic acid may be used. Vitamins E and C, homologues thereof or mixtures of these substances, as well as chromane, coumarane and their homologues may be utilized to advantage; phosphatides such as lecithin and cephalin, and products such as beef phosphatides rich in these ingredients are also useful. Antioxidant-containing seeds such as sesame seed, rapeseed, tomato seed, celery seed, etc. and meals such as soybean meal, cotton seed meal, wheat germ meal, corn germ meal, etc. are all suitable for use; solvent extracts of these products in which the antioxidants are concentrated are particularly useful. Highly active antioxidant-containing oils such as the vegetable germ oils may be used. Sugars and blackstrap molasses may be employed. Furthermore, products obtained by extracting antioxidant-containing vegetable oils with methanol and ethanol may also be utilized, although such extracts are not as effective as the preferred extracts above described; other products, prepared by processes such as high vacuum distillation designed to concentrate the antioxidants of vegetable oils in highly active fractions, may be used as the antioxidants in the practice of this invention.

In carrying out the process of this invention as applied to the alkali refining of a vitamin A and/or D containing oil, the refining step may be carried out as in prior practice, with the exception that a suitable amount of one of the above antioxidants is added to the oil prior to contact thereof with alkali. The amount of antioxidant incorporated in the vitamin A or D containing oil may vary widely, depending upon the effectiveness of the particular antioxidant employed, and upon the compatibility of this antioxidant with the vitamin-containing oil. In the case of the preferred vegetable oil extracts, a predetermined amount varying between about 0.1% and about 10% of the vitamin-containing oil is suitable; with less effective antioxidants, amounts as high as 30% or more may be added, the particular amount being determined by preliminary tests. The alkali refining treatment is preferably carried out by mixing an aqueous sodium or potassium hydroxide solution with the oil to be refined, whereby the free fatty acids present in the oil react to form a soap; this soap precipitates out and carries with it many of the undesirable odoriferous and taste-forming constituents. Preferably, enough alkali is added to the oil to saponify about 3% or less of the glyceride oil, since the color of the oil is thereby greatly improved. In some cases oils of a low free fatty acid content are most advantageously refined by first incorporating additional free fatty acid in the oil and then precipitating the acids as soap, since the additional free fatty acids increase the amount of soap formed, and more efficient removal of the odor and taste-forming constituents is thereby effected. The presence of the added antioxidants in the oil permits the production of an alkali refined oil practically as stable as the crude oil prior to refining. Hence such a product is eminently suitable for a wide variety of purposes.

My invention is particularly applicable to the preparation of vitamin A or D concentrates from fish liver oils. In carrying out this embodiment of my invention, the fish liver oil is first admixed with a suitable predetermined amount of one of the antioxidants employed in the practice of my invention. The amount of antioxidant incorporated in the oil may vary widely, depending upon the effectiveness of the antioxidant employed; when using the preferred vegetable oil extracts in accordance with this invention the amount of antioxidant added to the oil may vary between about 0.1% and about 10% of the oil, whereas with less effective antioxidants a greater quantity up to about 30% or more of the oil may be employed. The fish liver oil containing the antioxidants may then be saponified in the usual manner by mixing the oil with a suitable quantity of an aqueous sodium or potassium hydroxide solution until the oil is saponified, and then extracting the mass with a suitable solvent to recover the unsaponifiable fraction containing the vitamins concentrated therein. The oil may be totally or partially saponified, depending upon the desired potency of the final concentrate; in this connection it should be mentioned that the term "vitamin concentrate" is used herein in its broad sense to include any product prepared by total or partial saponification of a vitamin A or D containing oil, in which the vitamins are in more concentrated form than in the original oil. However, since ordinary saponification procedures inevitably leave a portion of the valuable unsaponifiable fraction in the soap, I prefer to carry out the saponification by the process described in copending application Serial No. 333,114, filed on May 3, 1940, in the names of Buxton and Simons, now Patent No. 2,318,748. In accordance with this process the fish liver oil is mixed with a water-immiscible solvent of the character of ethylene dichloride in an amount such that the weight of the solvent is less than that of the oil, a saponification catalyst such as isopropanol is incorporated in the solution, and the quantity of alkali necessary to saponify the oil to the desired degree is then gradually stirred into the mass, whereby a heavy super-solvented emulsion is formed which does not break when stirring ceases; the mass is then insulated against heat losses, permitted to stand for from 12 to 24 hours and then may be heated, whereby the emulsion is broken and the soap released in the form of feathery particles which may easily be separated from the solution of the unsaponifiable fraction in the solvent. The vitamin concentrate may then be recovered by evaporation of the solvent; it will be found that in accordance with this process practically none of the concentrate is occluded by the soap. Further details with respect to this preferred saponification procedure may be found in said copending application.

The vitamin concentrates prepared by the process of my invention possess properties which make them distinctly superior to vitamin concentrates prepared by ordinary saponification methods. In the first place, the odor and taste of the concentrates are considerably improved; this fact is surprising and could not have been predicted since the relationship of odor and taste to oxidative deterioration has not been clearly established by investigators in this art. Furthermore, it will be found that the vitamin concentrates prepared by my process are much more stable than vitamin concentrates prepared by saponification of a vitamin A or D containing oil in the absence of added antioxidants. This improved stability is particularly noticeable when employing the preferred vegetable oil extracts as the added antioxidants, since the active antioxidant principles of these extracts are not completely destroyed during the saponification, but are recovered to a substantial extent in the vitamin concentrates and thus tend to stabilize the latter. However, even when using antioxidants whose activity is diminished or destroyed during the saponification, it will be found that the resulting concentrates are more stable than those prepared in the absence of antioxidants; this observation is completely unexpected and may be attributable to a type of protective action exerted by the antioxidants on the concentrates as they are formed during the saponification. In other respects the vitamin concentrates prepared by the process of my invention are entirely similar to those known to the prior art and may, therefore, be used with even greater success for the purposes to which prior art concentrates are adaptable. They may be treated in accordance with customary practice to remove inactive sterols therefrom and may be otherwise processed to improve their characteristics.

It is to be understood that the above procedure may be modified somewhat in order to produce various types of concentrates. The vitamin-containing oil may be refined by treatment with activated carbon in the absence of air and in the presence of an inert gas, as disclosed in my copending application Serial No. 227,599, filed August 30, 1938, now Patent No. 2,306,776. Furthermore, in some cases it may be desirable to mix the vitamin-containing oil with the antioxidant, and then heat the oil to slightly elevated temperatures; such treatment, I have found, apparently destroys some of the peroxides contained in the oil so that the stability of the resulting product is considerably enhanced. Other modifications in the alkali refining or saponification process may also be introduced without departing from the scope of this invention, since it is evident that my invention is intended to broadly cover any such alkali treatment in the presence of added antioxidants.

The following examples are illustrative of my invention; amounts are given in parts by weight.

EXAMPLE I

An antioxidant extract was prepared by mixing 98 parts of wheat germ oil with 320 parts of 91% isopropanol, heating the mixture to about 62° C. in a nitrogen atmosphere, cooling the solution thus obtained to −18° C., withdrawing the solvent layer and filtering the layer thus withdrawn; the residue was then re-extracted as above described, the solvent extracts combined, and the solvent evaporated. 10 parts of this antioxidant extract were dissolved in 200 parts of shark liver oil containing 103,000 A units per gram. This solution was then mixed with 100 parts of ethylene dichloride and 6 parts of 99% isopropanol, and the mass saponified by the gradual addition thereto with agitation of 94 parts of 46% potassium hydroxide, the mixing being carried out in a nitrogen atmosphere. At the end of this time, a supersolvented soap emulsion had formed which was substantially solid throughout. This mass was insulated against heat loss for 12 hours, then heated at between about 60° C. and about 80° C. for one hour, cooled, and additional solvent added thereto; a small amount of water was then added to the mass until feathery soap particles separated. The solution was then separated from the soap particles and the soap extracted with additional quantities of ethylene dichloride; these extracts were added to the solution. The ethylene dichloride was then evaporated, whereby a light orange vitamin concentrate having a pleasant taste and odor and containing 1,330,000 A units per gram was obtained.

A similar concentrate was prepared in exactly the same manner except that 10 parts of a cottonseed oil extract obtained in the same manner as the wheat germ oil extract were incorporated in the shark liver oil.

Another concentrate was prepared in the same manner except that no antioxidant was added to the shark liver oil.

These concentrates were each diluted to 100,000 A units per gram with corn oil and then tested for their stability by maintaining them under accelerated conditions of destruction, i. e. at 34.5° C. in the presence of air, with the following results:

*Table II*

| Sample | Vitamin A destruction after— | |
|---|---|---|
| | 6 days | 12 days |
| Concentrate prepared from oil containing wheat germ oil extract | Per cent 27.5 | Per cent 66.7 |
| Concentrate prepared from oil containing cottonseed oil extract | 26 | 66 |
| Concentrate prepared from oil containing no additional antioxidant | 38 | 78 |

EXAMPLE II 200 parts of shark liver oil containing 103,000 A units per gram were mixed with 5 parts of the antioxidant fraction obtained from wheat germ oil as described in Example I. 100 parts of ethylene dichloride and 6 parts of 99% isopropanol were then mixed with the shark liver oil and the oil was then saponified as described in Example I, except that the amount of potassium hydroxide added was sufficient to saponify only about 50% of the oil.

A similar concentrate was prepared except that no antioxidant was added to the shark liver oil.

The above concentrates were then tested for their stability with the following results:

*Table III*

| Sample | Vitamin A destruction after— | | |
|---|---|---|---|
| | 6 days | 14 days | 20 days |
| Concentrate prepared from oil containing antioxidant | Per cent 3.09 | Per cent 16 | Per cent 22.6 |
| Concentrate prepared from oil containing no antioxidant | 13 | 39.9 | 65 |
| Crude oil | 6.28 | 18.1 | 30.6 |

Thus it will be noted that the concentrate prepared in the presence of the antioxidant was even more stable than the crude oil, whereas the concentrate prepared by the ordinary method was far less stable.

EXAMPLE III

Shark liver oil was saponified in the same manner as described in Example II, except that sufficient potassium hydroxide was added to saponify approximately 75% of the oil. The concentrates thus obtained were tested for their stability with the following results:

*Table IV*

| Sample | Vitamin A destruction after— | | |
|---|---|---|---|
| | 6 days | 14 days | 20 days |
| Concentrate prepared from oil containing antioxidant | Per cent 4.76 | Per cent 16.6 | Per cent 24.4 |
| Concentrate prepared from oil containing no antioxidant | 7.5 | 27 | 38 |
| Crude oil | 6.28 | 18.1 | 30.6 |

EXAMPLE IV 200 parts of shark liver oil were saponified in the same manner as described in Example I, except that 10 parts of blackstrap molasses were added to the oil in place of the wheat germ oil extract. The resulting concentrate containing 1,292,000 A units per gram had an excellent taste and odor, an extremely light color, and was stable to oxidizing influences.

EXAMPLE V 200 parts of shark liver oil were mixed with 20 parts of wheat germ meal, and 100 parts of ethyl dichloride and 6 parts of isopropanol were then added to the mixture and the mass stirred for a short while. This mixture was then saponified as described in Example I, whereby a concentrate containing 1,150,000 A units per gram and having an excellent color and improved stability towards oxidizing influences was obtained.

EXAMPLE VI 100 parts of tuna liver oil containing 126,200 A units and 15,000 D units per gram and 25% free fatty acids were mixed with 5 parts of the antioxidant fraction obtained from wheat germ oil as described in Example I. 50 parts of ethylene dichloride and 3 parts of isopropanol were then mixed with the oil and the free fatty acids, together with a small percentage of the glycerides, were saponified by the gradual addition of 10 parts of a 46% potassium hydroxide to the solution. The oil was recovered from the soap formed as described in Example I. The resulting oil was improved in its odor, taste and color and contained no free fatty acid.

It will be evident from the above description that the process of my invention permits the preparation of vitamin concentrates possessing properties far superior to those heretofore available. It further permits the partial saponification of vitamin A or D containing oils so as to produce oils of practically any desired potency which are extremely stable. Furthermore, oils which are alkali refined by the process of my invention show extremely improved characteristics. As a result, my invention will undoubtedly be of great value to the fat-soluble vitamin industry.

Since certain changes in carrying out the above process and certain modifications in the compositions which embody the invention may be made without departing from its scope, it is intended that all matter contained in the above description shall be interpreted as illustrative and not in a limiting sense.

Having described my invention, what I claim as new and desire to secure by Letters Patent, is:

1. A process of producing fat-soluble vitamin concentrates, which comprises admixing an antioxidant for vitamins A and D with a fat-soluble vitamin-containing marine oil, saponifying the marine oil by means of an alkali and separating the unsaponified fraction from the saponified mass, the antioxidant added to the oil prior to saponification serving to inhibit destruction of the vitamins during and after the saponification reaction.

2. A process of producing fat-soluble vitamin concentrates, which comprises admixing a fat-soluble vitamin-containing marine oil and a natural antioxidant concentrate prepared by contacting a natural antioxidant-containing vegetable oil at a temperature above room temperature with isopropanol, cooling the mass to a temperature within the range of 0° C. to —70° C. whereby an isopropanol layer containing the majority of the antioxidants separates, separating the isopropanol layer and removing the isopropanol from the antioxidant concentrate, saponifying the marine oil by means of an alkali and separating the unsaponified fraction from the saponified mass, the antioxidant added to the oil prior to saponification serving to inhibit destruction of the vitamins during and after the saponification reaction.

3. A process of producing fat-soluble vitamin concentrates, which comprises admixing a fat-soluble material rich in vitamin E with a fat-soluble vitamin-containing marine oil, saponifying the marine oil by means of an alkali and separating the unsaponified fraction from the saponified mass, the vitamin E added prior to saponification serving to inhibit destruction of the vitamins originally present in the marine oil during and after the saponification reaction.

4. A process of producing fat-soluble vitamin concentrates, which comprises admixing a fat-soluble vitamin-containing marine oil and a natural antioxidant concentrate prepared by contacting a natural antioxidant-containing wheat germ oil at a temperature above room temperature with isopropanol, cooling the mass to a temperature within the range of 0° C. to —70° C. whereby an isopropanol layer containing the majority of the antioxidants separates, separating the isopropanol layer and removing the isopropanol from the antioxidant concentrate, saponifying the marine oil by means of an alkali and separating the unsaponified fraction from the saponified mass, the antioxidant added to the oil prior to saponification serving to inhibit destruction of the vitamins during and after the saponification reaction.

5. A process of producing fat-soluble vitamin concentrates, which comprises admixing a fat-soluble vitamin-containing marine oil and a natural antioxidant concentrate prepared by contacting a natural antioxidant-containing cottonseed oil at a temperature above room temperature with isopropanol, cooling the mass to a temperature within the range of 0° C. to —70° C. whereby an isopropanol layer containing the majority of the antioxidants separates, separating the isopropanol layer and removing the isopropanol from the antioxidant concentrate, saponifying the marine oil by means of an alkali and separating the unsaponified fraction from the saponified mass, the antioxidant added to the oil prior to saponification serving to inhibit destruction of the vitamins during and after the saponification reaction.

LORAN O. BUXTON.